(12) United States Patent
Soreide et al.

(10) Patent No.: US 8,279,424 B2
(45) Date of Patent: Oct. 2, 2012

(54) SYSTEM AND METHOD FOR MOTION BASED VELOCITY DISCRIMINATION FOR DOPPLER VELOCIMETERS

(75) Inventors: David C. Soreide, Seattle, WA (US); Jonathan M. Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 12/703,348

(22) Filed: Feb. 10, 2010

(65) Prior Publication Data
US 2010/0134781 A1 Jun. 3, 2010

Related U.S. Application Data

(63) Continuation-in-part of application No. 12/040,250, filed on Feb. 29, 2008, now Pat. No. 7,667,826.

(51) Int. Cl.
*G01P 3/36* (2006.01)
(52) U.S. Cl. .......................................... 356/28.5; 356/28
(58) Field of Classification Search ......... 356/3.01–28.5
See application file for complete search history.

(56) References Cited

U.S. PATENT DOCUMENTS

| | | | |
|---|---|---|---|
| 4,105,915 A * | 8/1978 | Clay et al. | 398/201 |
| 6,137,574 A * | 10/2000 | Hill | 356/486 |
| 6,580,497 B1 * | 6/2003 | Asaka et al. | 356/28.5 |
| 7,299,013 B2 | 11/2007 | Rotta | |
| 2006/0256344 A1 * | 11/2006 | Sikora et al. | 356/477 |
| 2008/0024756 A1 | 1/2008 | Rogers | |

FOREIGN PATENT DOCUMENTS
JP 2004333165 11/2004

OTHER PUBLICATIONS

Patents Act 1977: Search Report under Section 17; Date of search: May 19, 2009; Application No. GB0901165.1; Claims searched: 1-14.
Patents Act 1977 Combined Search and Examination Report under Sections 17 & 18(3); Date of search: May 20, 2009; Applicaton No. PH/P46687GB.

* cited by examiner

*Primary Examiner* — Luke Ratcliffe
(74) *Attorney, Agent, or Firm* — Harness, Dickey & Pierce, P.L.C.

(57) ABSTRACT

A Doppler velocimeter apparatus that may have a coherent light source for generating a beam of coherent light. A modulating subsystem may receive and modulate at least a first portion of the beam of coherent light to form a first beam portion, the first beam portion forming a frequency offset and being a modulated, coherent optical signal. An optical element may receive the first beam portion and direct the first beam portion at a subject, the first beam portion being reflected from the subject to form a reflected beam that has a frequency that is modified in relation to the motion of the subject. A processing subsystem may receive a second portion of the beam of coherent light, and also the reflected beam, and uses the second beam portion and the reflected beam to determine a Doppler shift of the reflected beam.

22 Claims, 8 Drawing Sheets

FIGURE 8
700

Optical Fiber 702 712
704b
704
Voice Coil 702a
710
Electrical Signal Source 708
Oscillatory motion
704d
Coherent Optical Signal Generator 706

FIGURE 9
800

812
802
Voice Coil 804
Oscillatory Motion
806
808a
Electrical Signal Source 808
Coherent Optical Signal Generator

SYSTEM AND METHOD FOR MOTION BASED VELOCITY DISCRIMINATION FOR DOPPLER VELOCIMETERS

CROSS REFERENCE TO RELATED APPLICATIONS

The present application claims priority from U.S. application Ser. No. 12/040,250, filed Feb. 29, 2008, (now U.S. Pat. No. 7,667,826), the entire contents of which is incorporated by reference in the present disclosure.

FIELD

The present disclosure relates to velocimeters, and more particularly to a system and method for motion based velocity discrimination for Doppler velocimeters.

BACKGROUND

The statements in this section merely provide background information and may not constitute prior art.

Velocity measurements using a Laser Doppler technique do not inherently resolve the direction of the velocity. The current methods to determine the sign of the velocity tend to be complex, bulky and/or require significant electrical power. Additionally, previously developed systems and methods usually impose a secondary peak at zero velocity. This tends to create a dead band in velocity around zero velocity. For applications where the velocities are low, the dead band in velocity around zero velocity can be a significant performance limitation of such systems.

There are generally two classes of direction resolution solutions. The first class measures both the signal and quadrature of the electrical beat frequency. A Fourier transform of a time series including both signal and quadrature is generated that has both positive and negative frequencies. The second class of solutions imposes a fixed, offset frequency on a local oscillator of the system. The difference between a detected beat frequency and the fixed offset frequency can be both positive and negative, thus resolving the direction ambiguity. Two common methods are used for imposing a frequency offset. An Acousto-Optic Modulator can be used to impose an offset frequency in the range of about 30-250 MHz. A rotating radial grating can be used to impose lower frequency offsets.

The first class of solutions described above (i.e., measuring both signal and quadrature) also requires a complex optical subsystem which cannot be implemented in an optical fiber. With the second solution mentioned above, an acoustic optic-modulator is required. An acoustic optic-modulator is a relatively large and heavy component and typically requires several watts of radio frequency (RF) power to operate. It is also somewhat electrically noisy. The use of a rotating radial grating also has limitations associated with it. For one, this component requires a precision motor to rotate the grating at a fixed frequency. Without extreme care, the rotating grating is susceptible to vibration. Moreover, the use of a rotating radial grating is not easily adapted to an optical fiber system.

In certain Doppler velocimeter applications it may be preferable to avoid the use of optical fiber cabling when implementing the system. However, the above limitations can still exist with regard to being able to resolve the velocity magnitude and sign of the velocity, especially when the magnitude of the velocity is small.

SUMMARY

One embodiment relates to a Doppler velocimeter apparatus that may have a coherent light source for generating a beam of coherent light. A modulating subsystem may receive and modulate at least a first portion of the beam of coherent light to form a first beam portion, the first beam portion forming a frequency offset and being a modulated, coherent optical signal. An optical element may receive the first beam portion and direct the first beam portion at a subject, the first beam portion being reflected from the subject to form a reflected beam that has a frequency that is modified in relation to the motion of the subject. A processing subsystem may receive a second portion of the beam of coherent light, and also the reflected beam, and may use the second beam portion and the reflected beam to determine a Doppler shift of the reflected beam.

In another aspect a method for forming a Doppler velocimeter is disclosed. The method may comprise generating a beam of coherent light and modulating a first beam portion of the beam of coherent light to form a modulated first beam portion having a predetermined frequency. The method may further include obtaining at least a second portion of the beam of coherent light. The modulated first beam portion may be directed at a moving subject, where the modulated first beam portion reflects from the moving subject to form a reflected beam having a frequency related to a motion of the subject. A processing subsystem may be used to receive the second beam portion and the reflected beam. The processing subsystem may process the second beam portion and the reflected beam to determine a Doppler shift for the reflected beam.

In still another aspect a method is disclosed for forming a free space Doppler velocimeter is disclosed. The method may comprise using a laser to generate a beam of coherent light. A first beam portion of the beam of coherent light may be modulated using an element arranged to receive the first beam portion, the oscillating element generating a modulated first beam portion representing a modulated, coherent optical signal. A second beam portion may be generated from the beam of coherent light. The modulated first beam portion may be directed at a moving subject and reflected from the moving subject to form a reflected beam having a frequency related to a motion of the subject. A processing subsystem may receive the second beam portion and the reflected beam and may mix the second beam portion and the reflected beam to determine a Doppler shift for the reflected beam.

Further areas of applicability will become apparent from the description provided herein. It should be understood that the description and specific examples are intended for purposes of illustration only and are not intended to limit the scope of any of the embodiments or methods disclosed herein.

BRIEF DESCRIPTION OF THE DRAWINGS

The drawings described herein are for illustration purposes only and are not intended to limit the scope of any of the embodiments or methods disclosed herein.

FIG. 8 is another embodiment of a subsystem that makes use of a voice coil with an end of a fiber optic cable secured thereto, which is used for generating the modulated, coherent optical signal; and FIG. 9 is another embodiment of a subsystem that makes use of a voice coil with a mirror supported therefrom, for receiving a free space coherent optical signal and creating a free space, modulated, coherent optical signal.

DETAILED DESCRIPTION

The following description is merely exemplary in nature and is not intended to limit the present disclosure, application, or uses.

Figure 1:
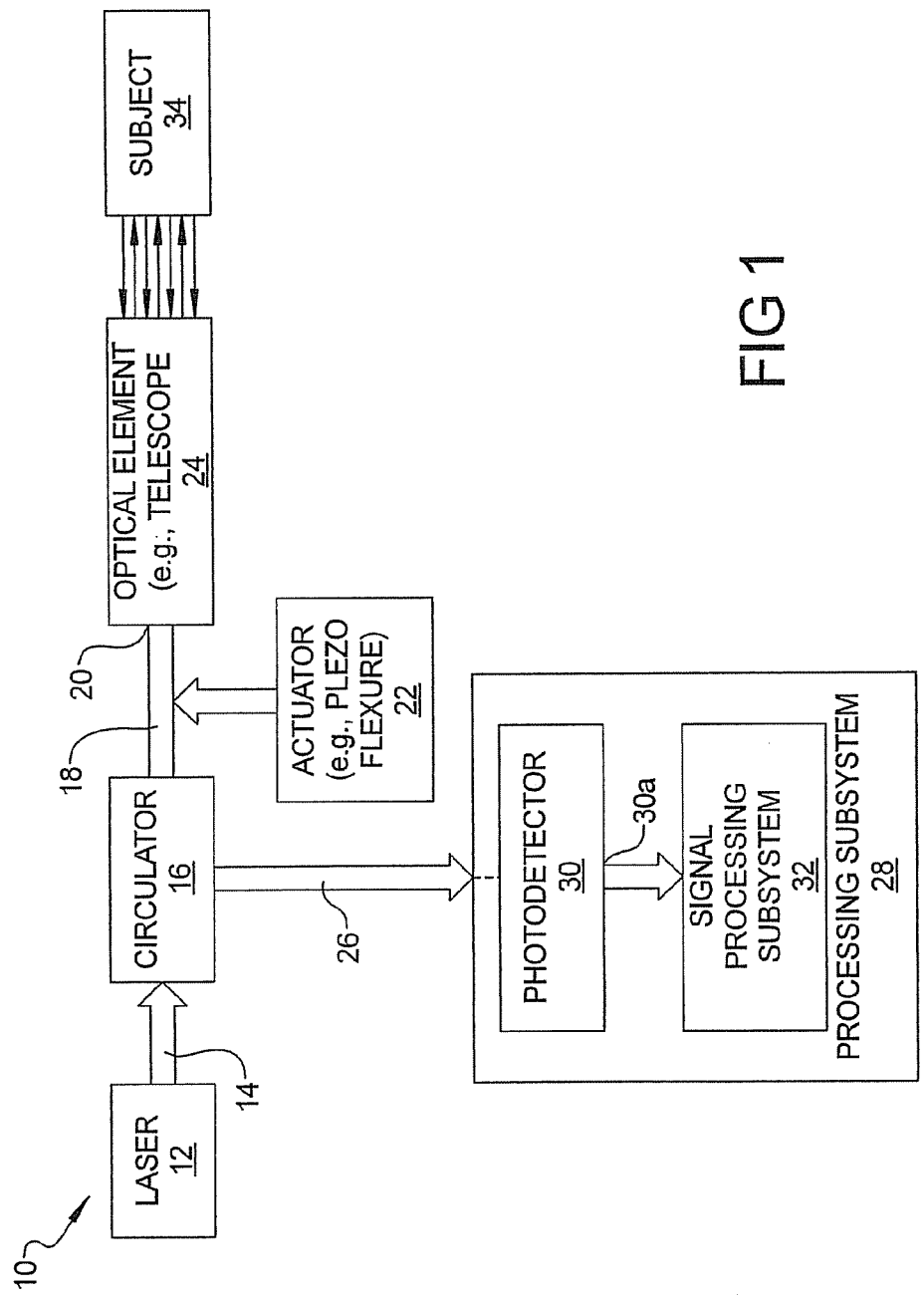
FIG. 1 is a high level block diagram of a system in accordance with one embodiment.

Referring to FIG. 1, there is shown a Doppler velocimeter apparatus 10 in accordance with one embodiment of the present disclosure. The apparatus 10 includes a component for generating coherent light, in this embodiment a laser 12. The laser 12 projects a beam of coherent light into a first fiber optic 14 which travels through a circulator 16. The circulator 16 passes the beam of coherent light through a second fiber optic 18 to an output face 20 that has been polished generally flat. The output face 20 is physically supported by an actuator 22 that moves the output face 20 in an oscillating motion along the longitudinal axis of the second fiber optic 18 (i.e., back and forth in a horizontal motion in the drawing of FIG. 1). The beam of coherent light is projected by an optical element 24, in this example a telescope. The circulator 16 includes a port that is coupled to a third fiber optic 26. The third fiber optic 26 is coupled to a processing subsystem 28 having a photodetector 30 and a signal processing subsystem 32.

The flat output face 20 of the second fiber optic 18 operates to reflect a first portion of the coherent light beam (typically about 4%) back through the circulator 16. The circulator 16 is a commercially available component available from a number of sources, for example AC-Photonics, Inc. of Santa Clara, Calif., PMOC-1550-A-2-1-1. The circulator 16 essentially acts as a multi-way valve to selectively direct optical signals between the laser 12 and the telescope 24, as well as to direct optical signals travelling in the opposite direction on the second fiber optic 18 to the processing subsystem 28. The photodetector 30 is also a commercially available component that may be obtained from a number of sources, for example from the New Focus Corp. of Los Angeles, Calif. The signal processing subsystem 32 may comprise a computer such as a personal computer or even a lap top computer.

The telescope 24 is used to both project the coherent beam of light exiting therefrom, as well as to receive scattered light that reflects off of a subject that 34 is being monitored with the apparatus 10. The actuator 22 that moves the output face 20 of the second fiber optic 18 may comprise a tuning fork, an electrically excited piezoelectric element (i.e., piezoelectric flexure), or any other structure that can impart a low amplitude (typically between about 30 microns-100 microns) oscillating motion of between about 100 Hz-10 KHz to the output face 20. As mentioned herein, the output face 20 is preferably polished generally flat, which causes a small amount of the coherent light to be reflected back into the second fiber optic 18. This causes the output face 20 to physically act as a "local oscillator" to generate a fixed optical reference signal that serves as a baseline signal when performing Doppler measurement/analysis.

Figure 2:
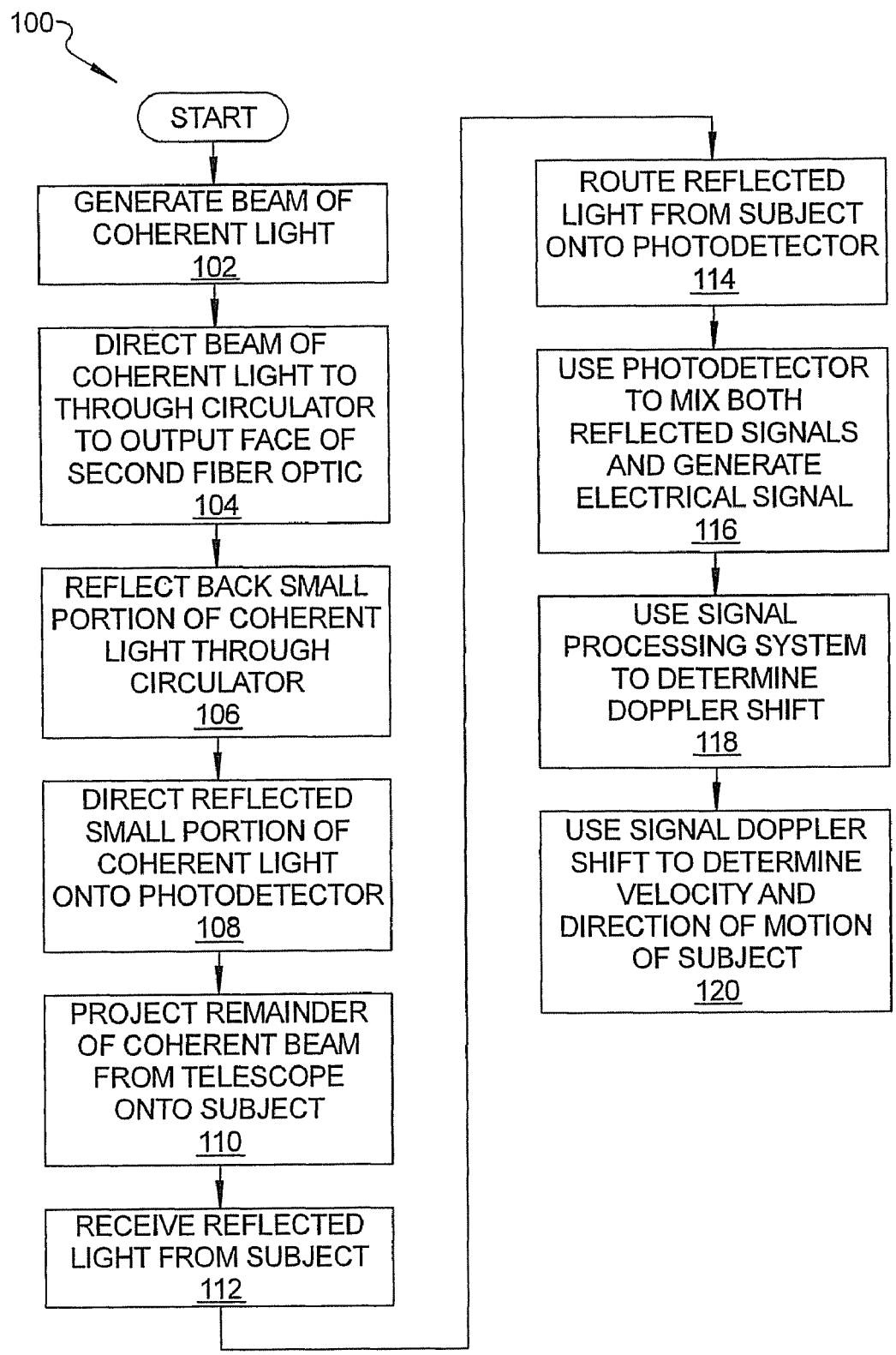
FIG. 2 is a flowchart of major operations performed in accordance with one implementation of a method.

Referring to FIG. 1 and the flowchart 100 of FIG. 2, the operation of the apparatus 10 will now be described. In operation, the laser 12 generates a beam of coherent light that passes through the first fiber optic 14 to the circulator 16, as indicated at operation 102. The beam of coherent light passes unimpeded through the circulator 16 and then through the second fiber optic 18 to its flat output face 20, as indicated at operation 104. A small portion of the coherent beam of light (i.e., the first portion of the coherent light) is reflected back by the flat output face 20 through the second fiber optic 18 and through the circulator 16, as indicated at operation 106. At operation 108 the reflected portion (i.e., first portion) of coherent light passes through the third fiber optic 26 onto the photo detector 30. At operation 110 the remaining beam of coherent light is projected by the telescope 24 onto the subject (or object) 34. At operation 112 the scattered light reflecting off of the subject 34, which forms the reflected optical signal, is received by the telescope and fed back in to the second fiber optic 18 through the output face 20. At operation 114 the second fiber optic 18 routes the reflected optical signal through the circulator 16, into the third fiber optic 26, and on to the photodetector 30. At operation 116 the photodetector 30 mixes the first portion of the coherent beam and the reflected optical signal incident thereon and generates an oscillating electrical signal at its output 30a. At operation 118 the oscillating electrical signal is fed into the signal processing subsystem 32 which analyzes the signal to determine the Doppler shift in frequency from the frequency offset produced by the oscillating output face 20. As indicated at operation 120, the Doppler shift is then used to determine the velocity and motion of the surface of the subject 34. The signal processing subsystem 32 thus measures the beat frequency of the motion of the subject 34.

In determining the direction of motion of the subject, it will be appreciated that if the surface of the subject 34 is stationary, then the signal processing subsystem 32 will be measuring two fixed frequencies, one when the physical motion is toward the object being measured and a second when the motion is away from the object. Some signal regions are generally discarded since the imposed frequency is changing too fast. No additional oscillating optical signal will be generated.

As the surface of the subject 34 moves, the oscillating electrical signal output from the photodetector 30 will have either a frequency larger than the offset frequency discussed above or a frequency smaller than the offset. A difference frequency can be calculated as the measured frequency minus the offset frequency. This quantity will have opposite signs, depending on the direction of movement of the output face 20 of the second fiber optic 18. For example, if the output face 20 is moving to the left in FIG. 1, while the surface of the subject 34 is moving to the right, then the difference frequency of the electrical signal at the photodetector 30 output 30a will be decreasing. In this instance the sign of the mixed optical signal from the photodetector will be negative. Conversely, if the output face 20 is moving to the right in FIG. 1, while the surface of the subject 34 is moving to the left, then the frequency of the electrical signal at the photodetector 30 output 30a will be increasing. In this instance the sign of the difference will be positive. Processing the oscillating electrical signal output from the photodetector 30) may likely require that the signal processing subsystem 32 process the positive and negative signal components separately.

Figure 3:
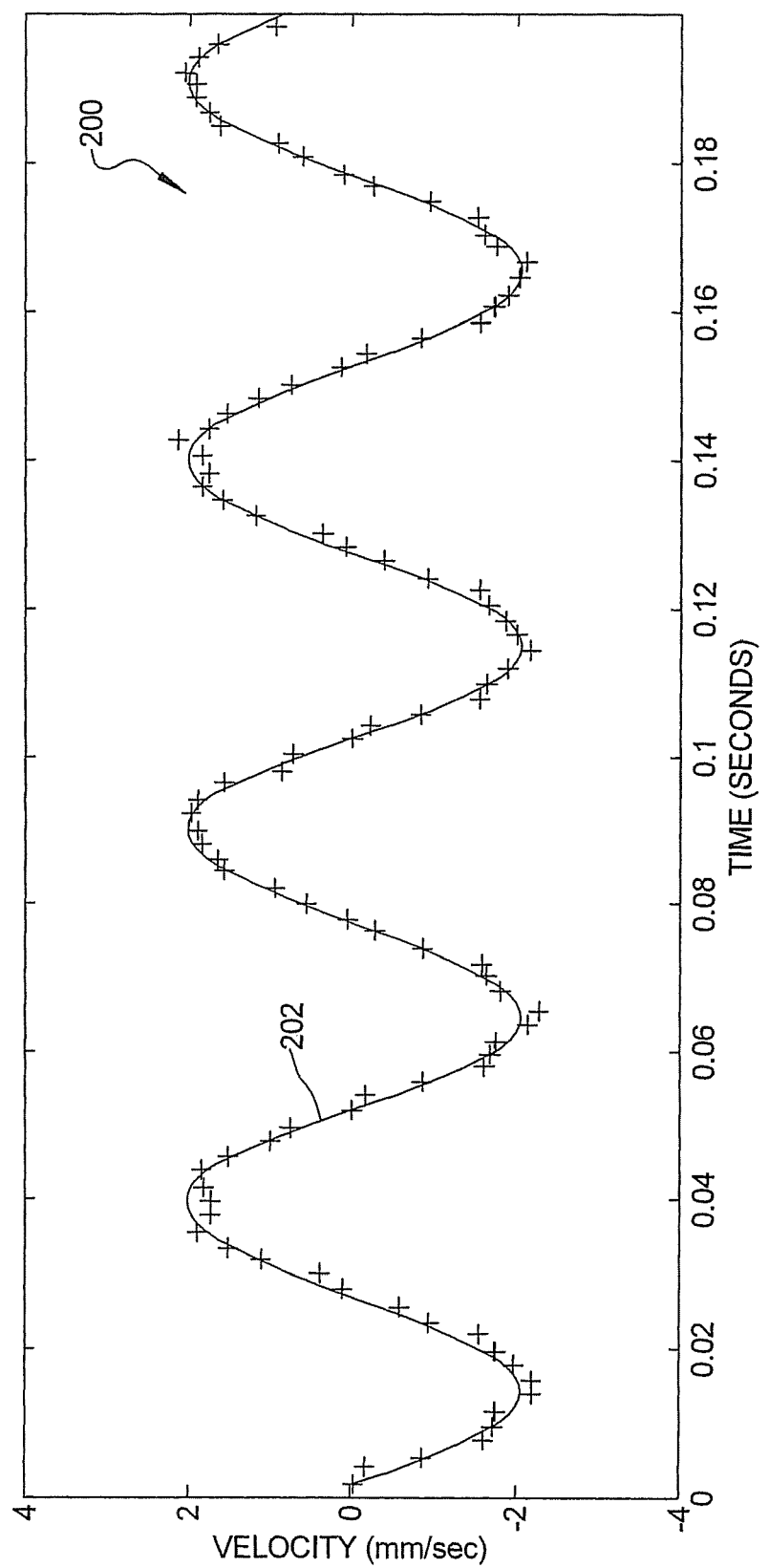
FIG. 3 is a graph showing a test result wherein the Doppler velocimeter was used to detect the motion of a test subject, and illustrating the high degree of accuracy with which the velocity of motion of the test subject, as well as its direction of motion, can be detected.

FIG. 3 illustrates a graph 200 showing test results for the apparatus 10. The solid sinusoidal waveform 202 was produced using a piezo-electric flexure stage (as the actuator 22) capable of moving the output face 20 of the fiber second optic 18 about 15 microns. With a 1.0 inch (25.4 mm) telescope, this did not significantly defocus the telescope 24. The piezo-flexure stage was driven in accordance with a 250 Hz sinusoidal signal. The surface being monitored was moved using a galvanometric motor at a 20 Hz frequency with an amplitude of 16 microns. The measured data points are denoted with "+" symbols. The difference between the data and the waveform 202 is approximately 200 microns per second However, some of this difference is due to noise in the galvanometric motor that was used. The noise on a fixed surface is typically around 20 microns per second. Note in particular that measurements are readily obtained at both the peak velocity points and at those areas of the waveform 202 where the velocity is zero.

Figure 4:
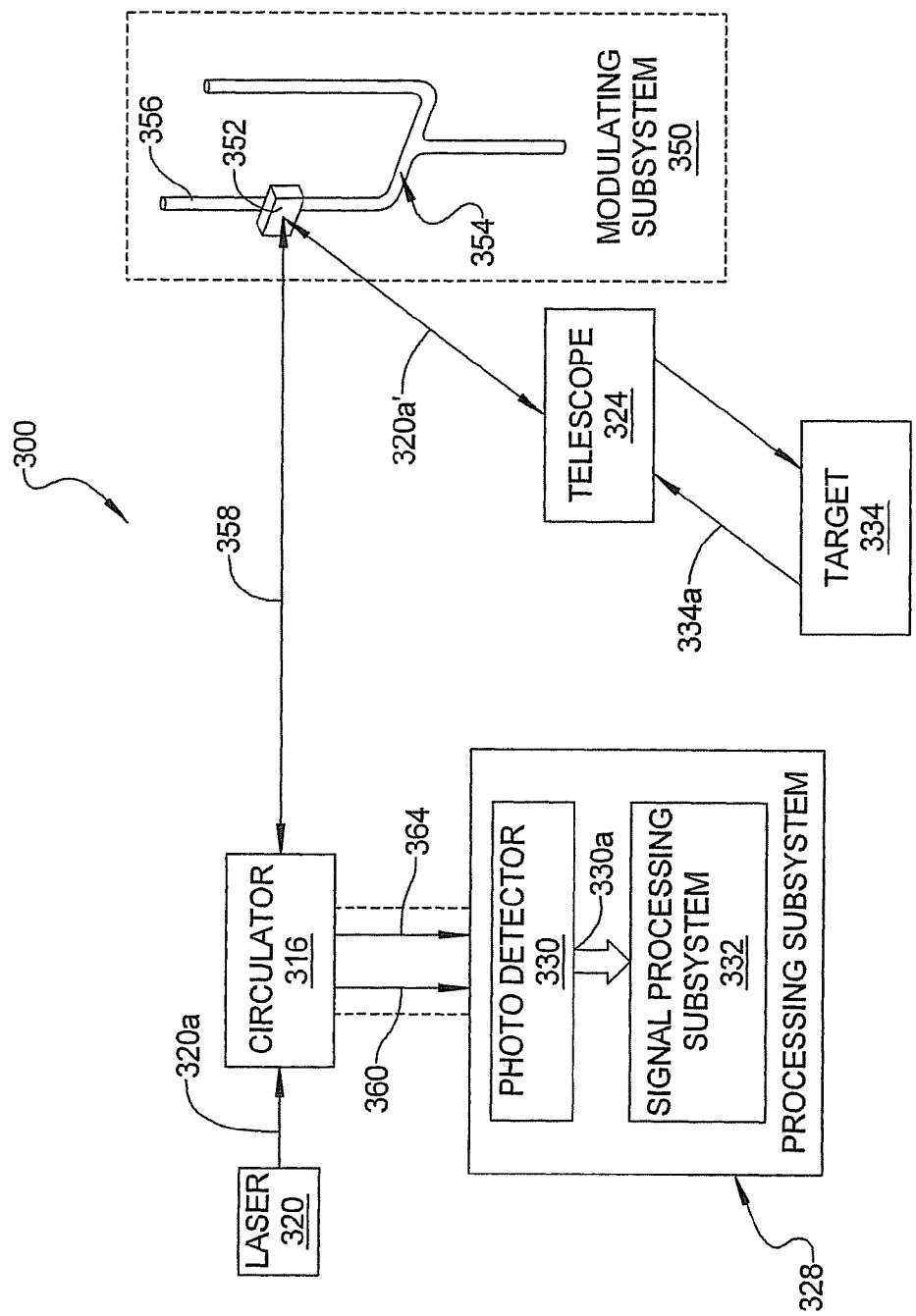
FIG. 4 is a block diagram of another embodiment that forms a free space Doppler velocimeter system.

Referring to FIG. 4, a free space Doppler velocimeter apparatus 300 in accordance with another embodiment is shown. By "free space" it is meant a Doppler velocimeter that makes use of wirelessly transmitted optical signals, and thus no optical fiber cables are required to communicate optical signals to the subject or to receive optical signals reflected from the subject. Components in common with the apparatus 10 are denoted by reference numbers increased by 300 over those used to describe the apparatus 10.

The apparatus 300 makes use of a coherent light generator, in this example laser 320. The laser 320 may direct a beam of coherent light 320a at a circulator 316. A first beam portion 358 of the beam, which represents a coherent beam of light, passes through the circulator 316 to a modulating subsystem 350, while a second beam portion 360 of the beam is diverted by the circulator 316 to a processing subsystem 328. The modulating subsystem 350 in this example is made up of a mirror 352 that is supported from a tine 356 of a tuning fork 354, for example by an adhesive or some mechanical clamp or other suitable means. The mirror 352 is arranged to oscillate by virtue of its being supported from the tine 356 of the tuning fork 354, and thus the first beam portion 358 of the coherent beam of light 320a that reflects from the mirror becomes a modulated first beam portion 320a'. The modulated first beam portion 320a' has a frequency in accordance with the frequency of oscillation of the tine 356a.

The modulated first beam portion 320a' is then directed to an optical element 324. In this example the optical element 324 may form a telescope that focuses the modulated beam of coherent light 320a on a subject 334. The modulated first beam portion 320a' is altered by motion of the target 334 and then reflected from the subject 334, as indicated by line 334a, back to the circulator 316, where the reflected beam portion 334a is then fed into the processing subsystem 328 by the circulator 316, as indicated by arrow 364. Thus, arrow 364 represents the reflected beam portion 334a being directed by the circulator 316 into the processing subsystem 328.

The circulator 316 may operate in the same fashion as described above for circulator 16. The circulator 316 may pass the second beam portion represented by arrow 360 and the reflected beam, represented by arrow 364, via one or more optical fibers into the processing subsystem 328. The processing subsystem 328 may include a photodetector 330 having an output 330a, as well as a signal processing subsystem 332 that is in communication with the output 330a.

The processing subsystem 328 uses the photodetector 330 and the signal processing subsystem 332 in the same manner as described above for photodetector 28 and signal processing subsystem 32 to determine the Doppler shift in frequency from the frequency offset produced by the oscillating mirror 352. The Doppler shift is then used to determine the velocity and motion of the surface of the subject 334. The method of operation of apparatus 300 is similar to that described above in connection with FIG. 2, with the exception that operations 104 and 106 instead now involve oscillating the mirror 352 to create the modulated coherent beam of light 320a' prior to directing the modulated first beam portion 320a' to the target 334. The operation of the apparatus 300 is otherwise the same as described in operations 102 and 108-120 of FIG. 4.

Figure 5:
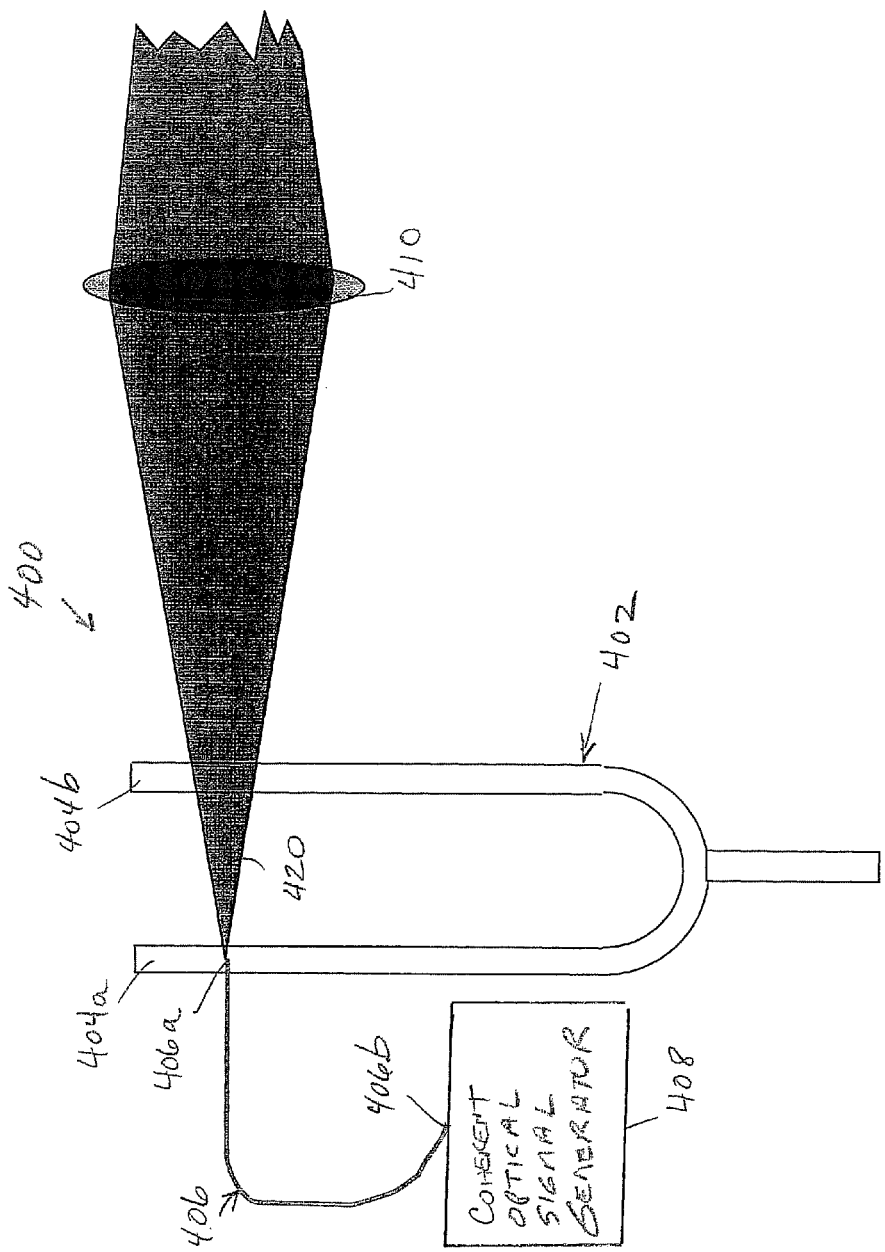
FIG. 5 is another embodiment showing the use of an optical fiber configured in a non-linear shape, which is secured to the tine of a tuning fork, for creating the modulated coherent optical signal.

Referring to FIG. 5, another embodiment of a subsystem 400 is shown for producing the modulated beam of coherent light 320a' in FIG. 4. The subsystem 400 may be implemented in place of the tuning fork 354 and free space laser 120 shown in FIG. 4, but otherwise the remaining components of the system 300 shown in FIG. 4, as well as their operation, would be the same as that described previously herein in connection with FIG. 4. In FIG. 5, the subsystem 400 may involve the use of a tuning fork 402 having a pair of tines 404a and 404b. One end 406a of a fiber optic cable 406 may be secured to one of the tines 404a,404b such as by adhesives or any other suitable mechanical means that does not impair the ability of the fiber optic cable 406 to transmit light therethrough, and which does not impair the ability of the tine 404a or 404b to vibrate. The opposite end 406b of the fiber optic cable 406 may be in communication with an output of a coherent optical light generator 408. For simplicity the circulator 316 and the processing subsystem 328 have been omitted, but it will be understood that the circulator 316 will be located between the output of the coherent optical signal generator 408 and the tine 404a. As such, in actual practice, typically two lengths of fiber optic cable would be employed, although, again for simplicity, only one fiber optic cable 406 has been illustrated in FIG. 5.

The coherent optical light generator 408 may be a laser or any other component or system that generates a coherent light output. When the tine 404a to which the end 406a of the fiber optic cable 406 is attached vibrates, this changes the distance from the end 406a to the target 334. Since the fiber optic cable 406 is arranged in a non-linear orientation and able to flex or bend slightly, this permits the end 406a of the fiber optic cable 406 to move with the vibration of the tine 404a. The optical signal 420 emitted from the end 406a of the fiber optic cable 406, which represents a modulated first beam portion, may be further focused through a conventional focusing element 422 (e.g., a portion of a telescope) before being received at the target, such as target 334 shown in FIG. 4. In this regard, then, it will be appreciated that the optical signal 420 is produced in place of the modulated first beam portion 320a' shown in FIG. 4.

Figure 6:
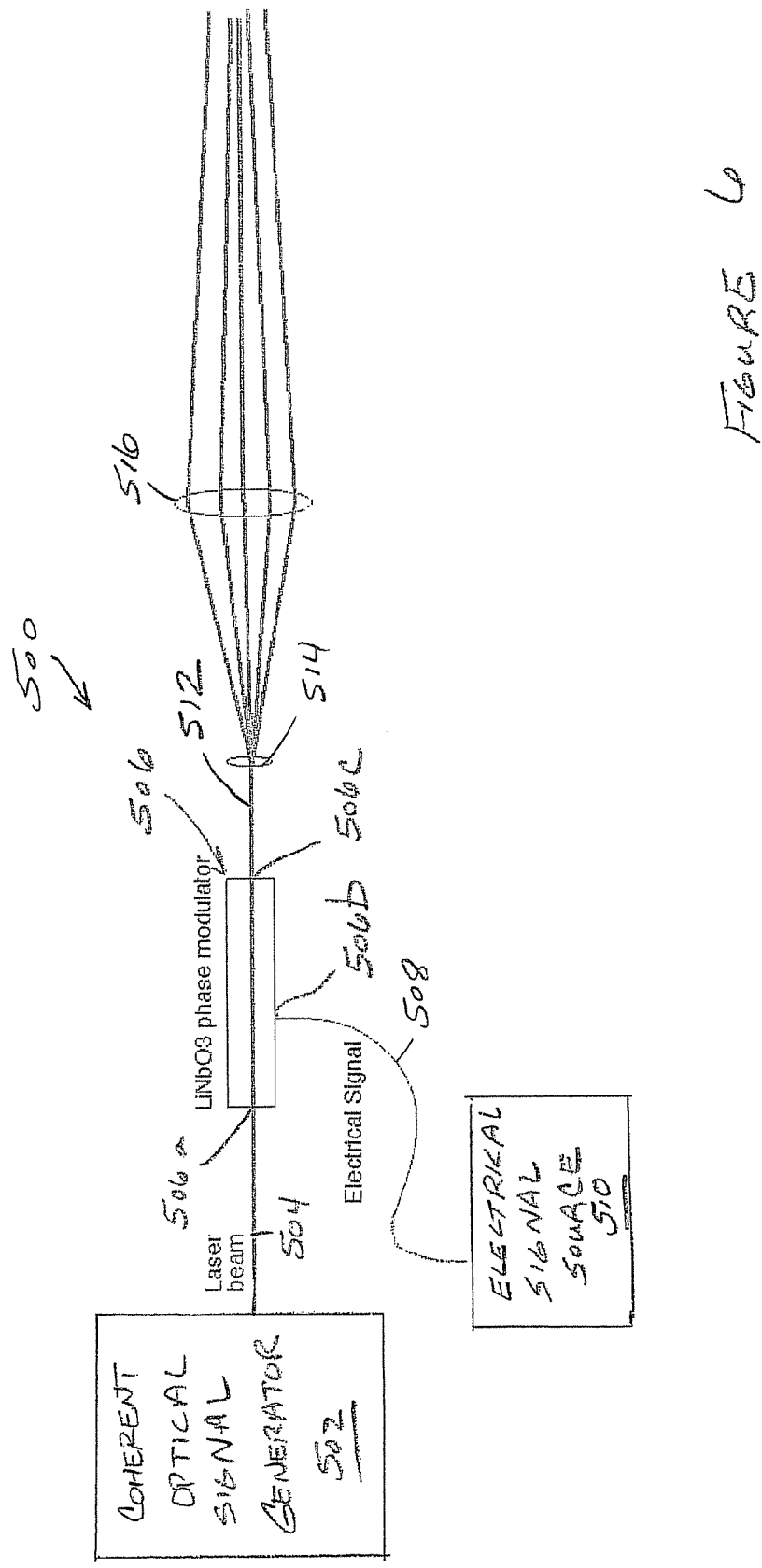
FIG. 6 is another embodiment of a subsystem that makes use of a Lithium Niobate phase modulator for generating the modulated, coherent optical signal.

Referring now to FIG. 6, there is shown another subsystem 500 in accordance with another embodiment for generating the modulated beam of coherent light 320a' that is used in the system 300 of FIG. 4. The subsystem 500 includes a coherent optical signal generator 502, for example a laser, which applies an optical input signal into an optical fiber 504. The optical fiber 504 transmits a first beam portion of the coherent optical signal to an input 506a of a Lithium Niobate phase modulator 506. Again, for simplicity, the circulator, which would normally be disposed between the signal generator 502 and the phase modulator 506, has been omitted. The phase modulator 506 modulates the coherent light signal received at its input 506a in accordance with the change in voltage of an electrical control signal applied via a conductor 508 to an input 506b of the phase modulator 506. The electrical control signal is generated by an electrical signal source 510 having an output 510a that feeds the electrical control signal into the electrical conductor 508. The changing voltage of the control signal applied via the electrical conductor 508 causes the phase modulator 506 to modulate the coherent optical signal received on its input 506a and to generate an oscillating, coherent optical signal at its output 506c, represented by signal 512, which represents the modulated first beam portion 320a' described in connection with the embodiment of FIG. 4. The modulated first beam portion 512 may have a frequency related to the changing voltage of the electrical control signal. The oscillating coherent optical signal may be transmitted via another optical fiber to one or more conventional focusing elements 514 and 516 (e.g., where components 514 and 516 form a portion of a telescope) to further focus the modulated first beam portion 512 as needed prior to the modulated first beam portion 512 being directed at the target (e.g., such as target 334). It will also be appreciated that instead of transmitting the coherent optical signal via the optical fiber 504, the coherent optical signal could be transmitted through free space provided an appropriate optical receiver element or subsystem is included at the input 506a of the phase modulator 506.

Figure 7:
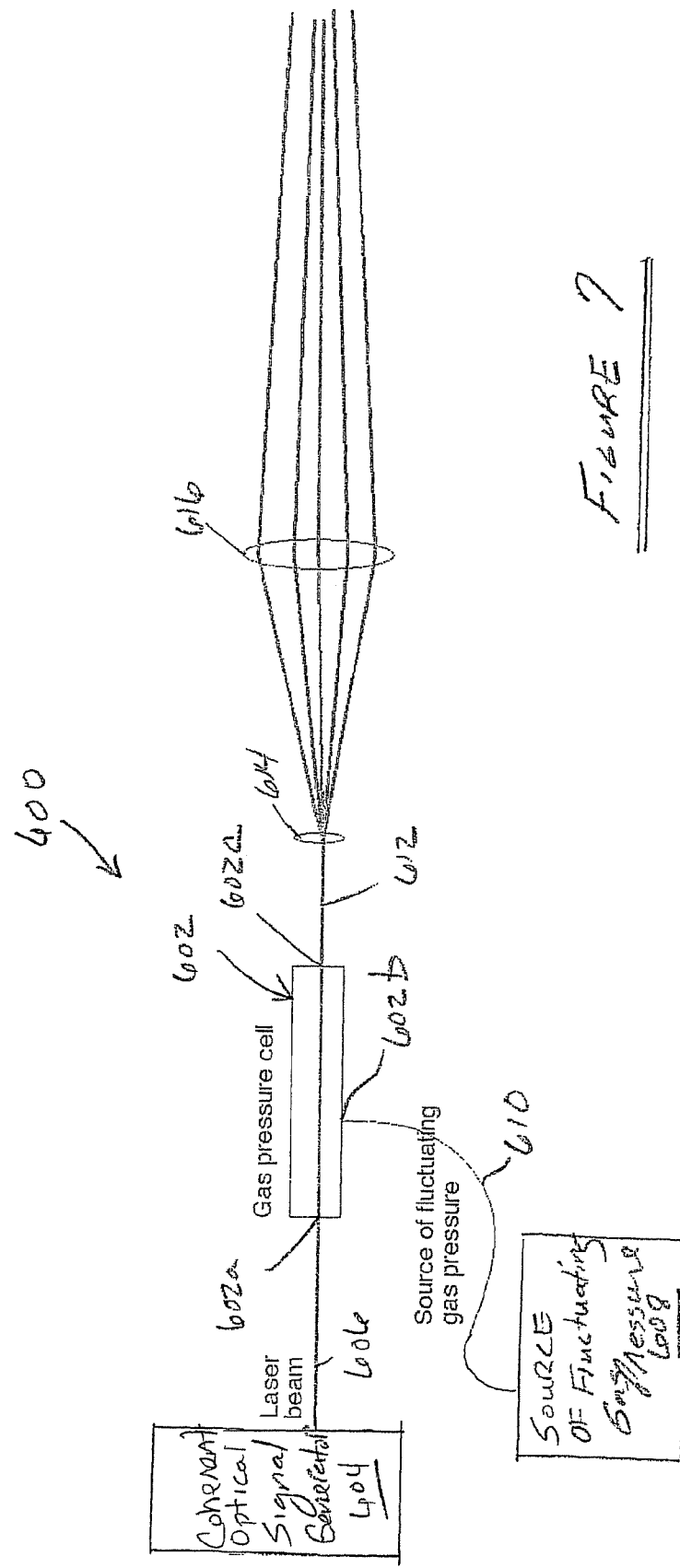
FIG. 7 is another embodiment of a subsystem that makes use of a gas pressure cell to generate the modulated, coherent optical signal.

Referring to FIG. 7 another subsystem 600 is shown in accordance with another embodiment for generating the modulated beam of coherent light 320a' that is used in the system 300 of FIG. 4. The subsystem 600 accomplishes modulating a coherent beam of light through the use of a gas pressure cell 602. The gas pressure cell 602 is located downstream of a coherent optical signal generator 604 (e.g., a laser) and receives a beam of coherent light from the coherent optical signal generator 604. Again, the circulator 316 and the processing subsystem 328 have been omitted for clarity, but the circulator would otherwise be shown between the output of the signal generator 604 and an input 602a of the gas pressure cell 602.

The coherent optical signal from the signal generator 604 may be transmitted either in free space or through a fiber optic cable 606 so that a first beam portion is applied to the input 602a of the gas pressure cell 602. The gas pressure cell 602 has another input 602b that may receive a fluctuating gas through a conduit 610 from a fluctuating pressurized gas source 608. The fluctuating pressurized gas that enters the gas pressure cell 602 causes a change in the pressure within the gas pressure cell 602. The change in pressure varies the optical path length within the gas pressure cell 602, which causes a modulated first beam portion 612 to be emitted from an output 602c of the gas pressure cell 602. The modulated first beam portion may be transmitted via a fiber optic cable to one or more focusing mirrors 614 and 616. The mirrors 614 and 616 may form a portion of a telescope.

With a 10 cm long gas pressure cell 602, and with a change in pressure of about 1 atmosphere, a change of about 28-30 microns in the optical path length through the gas pressure cell 602 is achieved. Thus, as the pressure of the pressurized gas being applied to the input 602b of the gas pressure cell 602 oscillates, the first beam portion emitted from the output 602c is caused to oscillate in relation thereto to form the modulated first beam portion 612. The modulated first beam portion 612 may subsequently be directed to the target 334 (FIG. 4) and reflected therefrom as a reflected signal.

It will be appreciated that while the gas pressure cell 602 has been illustrated as being located upstream of the lenses 614 and 616, it could just as readily be located between the two lenses 614 and 616, or even downstream of the lens 616. In any event, the gas pressure cell 602 should be downstream of the circulator 316 (FIG. 4).

Referring now to FIG. 8, another subsystem 700 for providing the modulated coherent optical signal to the circulator 316 (FIG. 4) is shown. The subsystem 700 makes use of a voice coil 702 that is physically attached to an output end 704b of a fiber optic cable 704. An input end 704a is coupled to an output of a coherent optical signal generator 706 and receives a first beam portion of a coherent optical signal which is transmitted through the fiber optic cable 704 to its output end 704b. Again, the circulator 316 and processing subsystem 328 have been omitted for clarity, but would typically be interposed between the signal generator 306 and the voice coil 704. As such, typically two lengths of fiber optic cable would be used to make up cable 704.

An electrical signal source 708 provides an oscillating electrical signal that is transmitted over a suitable electrical conductor 710 to an input 702a of the voice coil 702. The oscillating electrical signal causes an oscillatory motion of the voice coil 702, which changes the optical path length between the output end 704b of the fiber optic cable 704 and the target 334 in an oscillating fashion. This change in path length produces a modulated first beam portion 712 that may be used in place of the modulated signal 320a' in FIG. 4.

FIG. 9 shows another subsystem 800 which is somewhat similar to the system 700, but where a mirror 802 is physically attached to a voice coil 804. The voice coil 804 receives an oscillating electrical signal via a suitable conductor 806 that is coupled to an output 808a of an electrical signal source 808. Again, the circulator 316 and the processing subsystem 328 have been omitted, but otherwise would be located between the signal source 808 and the voice coil 804.

The oscillating electrical signal causes an oscillatory motion of the voice coil 804, which in turn causes a corresponding oscillation of the mirror 802. The oscillation may vary in accordance with a changing voltage of the oscillating electrical signal. The mirror 802 receives a first beam portion of a free space coherent optical signal from a free space coherent optical signal generator 810. The oscillatory motion of the mirror 802 changes the optical path length between the mirror 802 and the target 334, in an oscillatory fashion, which produces a modulated first beam 812 that is transmitted from the mirror 802 toward the target 334.

The apparatuses 10 and 300 described herein, as well as the various subsystems disclosed herein for generating the modulated, coherent optical signal (either through free space or an optical fiber) can be used in a wide variety of velocity detection/monitoring applications. For example, the apparatuses 10 and 300 can be used in optically detecting very slight (i.e., low amplitude) oscillating motion, such as for detecting a pulse in the wrist or neck area of an individual. As such, the apparatuses 10 and 300 are expected to find significant utility in medical applications where respiration or other vital signs of a patient need to be monitored.

The apparatuses 10 and 300 thus each provide a significant advantage in that the frequency offset is generated by either moving an output end of an optical fiber, or by moving a mirror on which a free space optical signal is present, or by the other methods disclosed herein, to generate the desired frequency offset. Previously developed devices require a more complex system that is capable of either measuring the quadrature of the electrical signal, or alternatively of imposing a frequency offset on a local oscillator using complex acousto-optic modulators or by rotating a radial grating that the coherent light beam passes through. Such subsystems are not required with either the apparatus 10 or the apparatus 300, or their methods of operation. The apparatus 10 and the apparatus 300, as well as the various subsystems for generating the modulated, coherent optical signal, are thus significantly less complex and less costly to implement than previously developed systems. In fiber optic systems the apparatus 10 eliminates the frequency peak at zero velocity of the subject, and also eliminates the usual "dead band" that occurs around zero velocity. These same advantages are also realized in the apparatus 300. Overall, the components required to construct the apparatus 10, as well as the apparatus 300, are fewer and less costly than those required to construct previously developed Doppler velocimeters.

While various embodiments have been described, those skilled in the art will recognize modifications or variations which might be made without departing from the teachings presented herein. The examples illustrate the various embodiments and are not intended to limit the disclosure. Therefore, the description and claims should be interpreted liberally with only such limitation as is necessary in view of the pertinent prior art.

What is claimed is:

1. A Doppler velocimeter apparatus, comprising:
    a coherent light source for generating a beam of coherent light;
    a circulator for receiving the beam of coherent light and generating a first portion of the beam of coherent light and a second portion of the beam of coherent light;
    a modulating subsystem that receives and modulates at least the first portion of the beam of coherent light to form a first beam portion, the first beam portion forming a frequency offset and being a modulated, coherent optical signal;
    an optical element for receiving the first beam portion and directing the first beam portion at a subject, the first beam portion being reflected from the subject to form a reflected beam that has a frequency that is modified in relation to the motion of the subject;
    the circulator being configured to receive the reflected beam and the second portion of the beam of coherent light and to channel the reflected beam and the second portion of the beam of coherent light therefrom;
    a processing subsystem that receives, from the circulator, the second portion of the beam of coherent light, and also the reflected beam, and uses the second portion of the beam of coherent light and the reflected beam to determine a Doppler shift of the reflected beam.

2. The apparatus of claim 1, wherein said coherent light source comprises a laser beam.

3. The apparatus of claim 1, wherein said processing subsystem comprises:
    a photo detector that receives and mixes said second beam portion and said reflected beam, and generates an electrical output signal in accordance therewith; and
    a signal processing subsystem for receiving said electrical output signal at an input thereof and generating an output signal indicative of said Doppler shift.

4. The apparatus of claim 1, wherein said modulating subsystem comprises a mirror that is moved in an oscillating fashion, the mirror receiving the first beam portion and generating the modulated, coherent optical signal.

5. The apparatus of claim 1, wherein said modulating subsystem comprises a tuning fork having an output end of an optical fiber cable secured to a tine of the tuning fork, the optical fiber cable transmitting said first beam portion to the output end, and the tine of the tuning fork imparting an oscillating motion to the output end of the optical fiber cable in accordance with oscillating motion of the tine of the tuning fork, the oscillating motion resulting in the modulated, coherent optical signal.

6. The apparatus of claim 1, wherein said modulating subsystem includes a Lithium Niobate phase modulator that receives the first beam portion, and an electrical signal source for controlling the Lithium Niobate phase modulator such that the first beam portion is turned into the modulated, coherent optical signal when emitted from the Lithium Niobate phase modulator.

7. The apparatus of claim 1, wherein said modulating subsystem includes a gas pressure cell that receives the first beam portion, and a gas signal from a gas source having a fluctuating pressure, the gas pressure cell generating the modulated coherent optical signal therefrom in accordance with the change in pressure of the gas signal.

8. The apparatus of claim 1, wherein the modulating subsystem includes a voice coil that has an output end of an optical fiber cable secured thereto, the optical fiber cable receiving the first beam portion at an input end thereof, and motion of the voice coil producing the modulated, coherent optical signal at the output end of the optical fiber cable.

9. The apparatus of claim 1, wherein the modulating subsystem includes a voice coil having a mirror secured thereto, the mirror receiving the first portion of the beam of coherent light and motion of the voice coil causing the first portion of the beam of coherent light to be turned into the modulated, coherent optical signal.

10. The apparatus of claim 4, wherein said modulating subsystem further comprises an oscillating element that oscillates at a predetermined frequency, and wherein said mirror is supported from said oscillating element.

11. The apparatus of claim 5, wherein the oscillating element comprises a tuning fork.

12. The apparatus of claim 5, wherein the oscillating element comprises a voice coil.

13. A method for forming a Doppler velocimeter, the method comprising:
    generating a beam of coherent light;
    using a circulator to generate a first portion of the beam of coherent light and a second portion of the beam of coherent light;
    receiving the first portion of the beam of coherent light from the circulator and modulating the first portion of the beam of coherent light to form a modulated first beam portion having a predetermined frequency;
    directing the modulated first beam portion at a moving subject, the modulated first beam portion reflecting from the moving subject to form a reflected beam having a frequency related to a motion of the subject;
    using a processing subsystem to receive both the second portion of the beam of coherent light and the reflected beam from the circulator; and
    using the processing subsystem to process the second portion of the beam of coherent light and the reflected beam to determine a Doppler shift for the reflected beam.

14. The method of claim 13, wherein said generating a beam of coherent light comprises generating a beam of light from a laser.

15. The method of claim 13, wherein said modulating said first portion of the beam of coherent light comprises reflecting said first portion of the beam of coherent light off of an oscillating mirror.

16. The method of claim 15, wherein said modulating said first portion of the beam of coherent light further comprises supporting said mirror from a tine of one of:
    a tuning fork, such that said mirror is moved in accordance with an oscillating motion of said tine; or
    a voice coil, such that said mirror is moved in accordance with an oscillating motion of said voice coil.

17. The method of claim 13, wherein said modulating said first portion of the beam of coherent light further comprises supporting an output end of a length of optical fiber cable from a tine of a tuning fork, with an input end of the length of optical fiber cable receiving the beam of coherent light, and oscillatory motion of the tine producing the modulated first portion of the beam of coherent light.

18. The method of claim 13, wherein said modulating said first portion of the beam of coherent light includes using a Lithium Niobate phase modulator to receive the first portion of the beam of coherent light, and using an electrical signal source for controlling the Lithium Niobate phase modulator such that the first portion of the beam of coherent light is turned into the modulated first portion of the beam of coherent light when emitted from the Lithium Niobate phase modulator.

19. The method of claim 13, wherein said modulating said first portion of the beam of coherent light comprises directing the first portion of the beam of coherent light into a gas pressure cell, and applying a gas signal from a gas source having a fluctuating pressure, to the gas pressure cell, the gas pressure cell emitting the modulated first portion of the beam of coherent light therefrom in accordance with a changing pressure within the gas pressure cell.

20. The method of claim 13, wherein said using a processing subsystem to process the second beam portion and the reflected beam comprises using the processing subsystem to mix the second portion of the beam of coherent light and the reflected beam.

21. A method for forming a free space Doppler velocimeter, the method comprising:
  using a laser to generate a beam of coherent light;
  using a circulator to receive the beam of coherent light and to generate a first beam portion and a second beam portion;
  modulating the first beam portion of said beam of coherent light using an element arranged to receive the first beam portion, the oscillating element generating a modulated first beam portion representing a modulated, coherent optical signal;
  directing at least a portion of the modulated first beam portion at a moving subject, the modulated first beam portion reflecting from the moving subject to form a reflected beam having a frequency related to a motion of the subject;
  using the circulator to receive the reflected beam;
  using a processing subsystem to receive the second beam portion and the reflected beam from the circulator; and
  using the processing subsystem to mix the second beam portion and the reflected beam to determine a Doppler shift for the reflected beam.

22. The method of claim 21, wherein said using an oscillating element comprises using at least one of a voice coil and a tuning fork to support a mirror thereon, the mirror generating the modulated first beam portion.

* * * * *